United States Patent
Wallace

(10) Patent No.: US 7,547,234 B2
(45) Date of Patent: Jun. 16, 2009

(54) MEMORY CARD ELECTRICAL CONTACT STRUCTURE

(75) Inventor: Robert F. Wallace, Sunnyvale, CA (US)

(73) Assignee: SanDisk Corporation, Milpitas, CA (US)

( * ) Notice: Subject to any disclaimer, the term of this patent is extended or adjusted under 35 U.S.C. 154(b) by 0 days.

(21) Appl. No.: 10/639,051

(22) Filed: Aug. 11, 2003

(65) Prior Publication Data

US 2004/0062109 A1    Apr. 1, 2004

Related U.S. Application Data

(63) Continuation of application No. 09/590,029, filed on Jun. 7, 2000, now Pat. No. 6,634,561.

(60) Provisional application No. 60/140,963, filed on Jun. 24, 1999.

(51) Int. Cl.
*H01R 24/00* (2006.01)
(52) U.S. Cl. .......... 439/630; 439/928.1; 439/55; 439/60; 235/441; 235/486; 235/492
(58) Field of Classification Search .......... 439/946, 439/60, 638–9, 68, 170, 217, 218, 59, 630, 439/928.1, 55; 361/737; 379/357.02; 235/441, 235/486, 492
See application file for complete search history.

(56) References Cited

U.S. PATENT DOCUMENTS

| | | | |
|---|---|---|---|
| 3,702,464 A | 11/1972 | Castrucci | |
| 4,264,917 A | 4/1981 | Ugon | |
| 4,532,419 A | 7/1985 | Takeda | |
| 4,555,619 A | 11/1985 | Anderson | |
| 4,565,922 A * | 1/1986 | Anderson | 235/492 |
| 4,752,678 A | 6/1988 | Rikuna | |
| 4,764,666 A | 8/1988 | Bergeron | |
| 4,766,293 A | 8/1988 | Boston | |
| 4,766,480 A | 8/1988 | Hamada | |
| 4,849,944 A | 7/1989 | Matsushita | |
| 4,864,116 A | 9/1989 | Banjo et al. | 235/492 |

(Continued)

FOREIGN PATENT DOCUMENTS

AU    B8130691    7/1991

(Continued)

OTHER PUBLICATIONS

SD Group, "SD Memory Card Simplified Specifications, Part 1, Physical Layer Specification", Version 0.96, Jan. 2000, 28 pages.

(Continued)

*Primary Examiner*—Truc T Nguyen
(74) *Attorney, Agent, or Firm*—Jenkins, Wilson, Taylor & Hunt P.A.

(57) ABSTRACT

A small, flat rectangularly shaped electronic circuit card, such as one containing non-volatile memory, has a row of contacts mounted on bottom surfaces of a row of recesses extending along a short edge and an adjacent angled corner. At least one of the recesses opens to the angled corner and the remaining recesses open to the short edge. Two surface contacts are included in at least one of the recesses, while the remaining recesses each contain a single contact.

8 Claims, 1 Drawing Sheet

U.S. PATENT DOCUMENTS

| | | | |
|---|---|---|---|
| 4,885,482 A * | 12/1989 | Sharp et al. | 439/218 |
| 4,887,234 A | 12/1989 | Iijima | |
| D305,886 S | 2/1990 | Banjo et al. | |
| 5,003,520 A | 3/1991 | Grieu et al. | |
| 5,031,026 A | 7/1991 | Ueda | |
| 5,049,728 A | 9/1991 | Rovin | |
| 5,272,374 A | 12/1993 | Kodai et al. | |
| D353,135 S | 12/1994 | Gloton | |
| 5,375,037 A | 12/1994 | Le Roux | |
| D357,909 S | 5/1995 | Gloton | |
| 5,612,532 A | 3/1997 | Iwasaki | |
| 5,655,917 A | 8/1997 | Kaneshige et al. | |
| 5,677,524 A | 10/1997 | Haghiri-Tehrani | |
| 5,714,742 A | 2/1998 | Ieda | |
| 5,731,633 A * | 3/1998 | Clayton | 257/723 |
| 5,757,116 A | 5/1998 | Nishikawa et al. | |
| 5,780,837 A * | 7/1998 | Garcia | 235/492 |
| 5,822,190 A | 10/1998 | Iwasaki | 361/737 |
| 5,984,708 A | 11/1999 | Yu | |
| 5,992,754 A * | 11/1999 | Ito et al. | 235/486 |
| 6,040,622 A | 3/2000 | Wallace | |
| 6,056,573 A | 5/2000 | Nishioka | 439/326 |
| 6,059,191 A | 5/2000 | Sedlak et al. | |
| 6,062,887 A * | 5/2000 | Schuster et al. | 439/218 |
| 6,072,698 A | 6/2000 | Houdeau et al. | |
| 6,109,939 A | 8/2000 | Kondo et al. | 439/140 |
| 6,111,757 A * | 8/2000 | Dell et al. | 361/737 |
| 6,121,681 A | 9/2000 | Tanaka et al. | |
| D434,396 S | 11/2000 | Iwasaki | |
| 6,181,564 B1 | 1/2001 | Furusho | |
| 6,189,055 B1 * | 2/2001 | Eisele et al. | 710/62 |
| D443,622 S | 6/2001 | Iwasaki et al. | |
| D444,473 S * | 7/2001 | Okamoto et al. | D14/436 |
| D445,096 S | 7/2001 | Wallace | D12/114 |
| D445,111 S | 7/2001 | Okamoto et al. | |
| 6,295,206 B1 | 9/2001 | Kondo et al. | |
| 6,312,268 B1 | 11/2001 | Chih-Kai | |
| 6,333,854 B1 * | 12/2001 | Sasaoka et al. | 361/737 |
| 6,341,728 B1 | 1/2002 | Kondo et al. | |
| 6,381,143 B1 | 4/2002 | Nakamura | |
| 6,483,038 B2 | 11/2002 | Lee et al. | |
| 6,580,615 B1 | 6/2003 | Nakanishi et al. | |
| 6,590,778 B1 | 7/2003 | Hojo et al. | |
| 6,617,673 B2 | 9/2003 | Lee et al. | |
| 6,623,304 B2 | 9/2003 | Harasawa et al. | |
| 6,632,097 B2 | 10/2003 | Chang | |
| 6,646,885 B1 | 11/2003 | Yu et al. | |
| 6,733,340 B2 | 5/2004 | Nishio et al. | |
| 2001/0009505 A1 | 7/2001 | Nishizawa et al. | |

FOREIGN PATENT DOCUMENTS

| | | | |
|---|---|---|---|
| DE | 3743335 | | 12/1987 |
| DE | 197 04 955 | * | 10/1997 |
| EP | 495216 A2 | | 12/1991 |
| EP | 535436 A2 | | 9/1992 |
| FR | 2627880 | * | 2/1988 |
| JP | 58208882 | | 12/1983 |
| JP | 5941092 | | 3/1984 |
| JP | 454582 | | 2/1992 |

OTHER PUBLICATIONS

SD Group, "SD Memory Card Specifications, Simplified Version of Part 1, Physical Layer Specification", Version 1.01, Apr. 15, 2001, 32 pages.

SanDisk Corporation MultiMedia Card Product Manual, 2000, pp. 1-86.

MMCA Technical Committee System Specification, "The MultiMedia Card", Version 1.4 Official Release, February 1998, pp. 1-106.

* cited by examiner

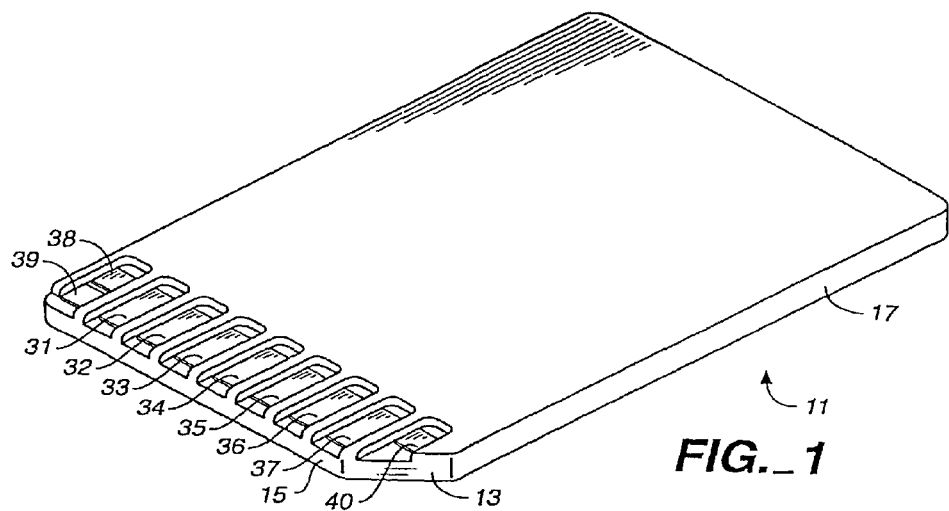
FIG._1
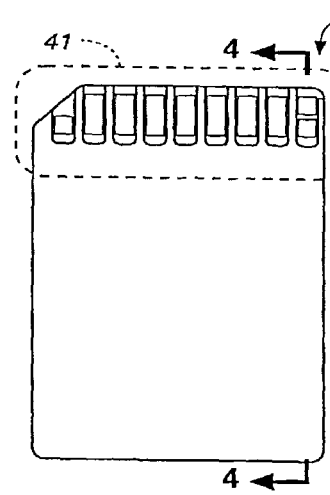
FIG._2
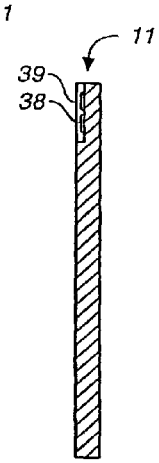
FIG._4
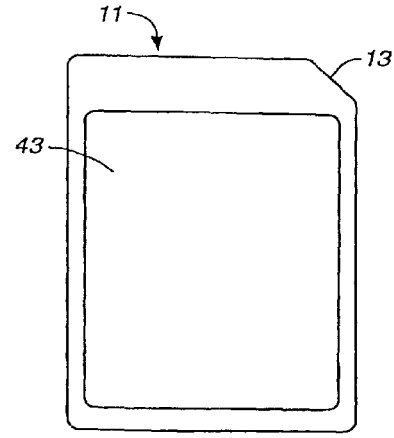
FIG._5
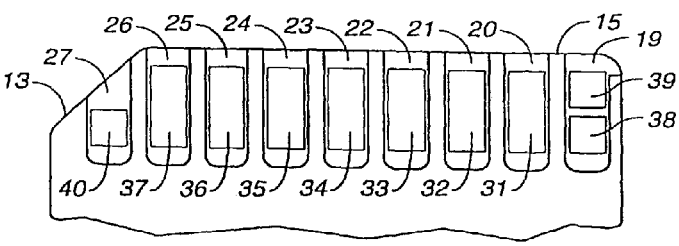
FIG._3

MEMORY CARD ELECTRICAL CONTACT STRUCTURE

CROSS-REFERENCE TO RELATED APPLICATIONS

This application is a continuation of application Ser. No. 09/590,029, filed Jun. 7, 2000, now U.S. Pat. No. 6,634,561, which application is incorporated herein in its entirety by this reference and claims the benefit of provisional application Ser. No. 60/140,963, filed Jun. 24, 1999, which provisional application is incorporated herein by this reference.

BACKGROUND OF THE INVENTION

This invention relates to a small card containing digital memory, such as a non-volatile flash EEPROM system, having exposed surface electrical contacts that allow easy connection to and removal from a receptacle of a host electronic system or device, particularly portable devices, in order to provide removable electrical connection between the system or device and the memory within the card through the exposed surface contacts of the card.

Small memory cards are increasing in popularity for use in small hand held devices such as cellular telephones, music players and other personal electronic equipment. Memory cards are being made smaller for such applications while the size of their individual external surface electrical contacts are not being reduced in size to any significant degree. This presents a challenge to the design and packaging of such memory cards. In a specific example, an existing commercial Multi-Media Card (MMC) product has been manufactured and sold for a time. The MMC has seven surface contacts extending across a short edge of the rectangular card that also includes a cut-off corner. Evolving applications for this type of memory card have made it necessary to add several external contacts without increasing the size of the card.

SUMMARY OF THE INVENTION

This has been accomplished by increasing the number of contacts of the row of contacts used on the MMC product while maintaining the position of the row along the short edge of the rectangularly shaped card. This maintains a degree of compatibility between the MMC product and the new card, known as a SD Card product. In order to increase the number of contacts, two contacts are positioned in the space previously occupied by one and another contact is positioned at the cut off corner and set back from the card edge a distance that is greater than other contacts of the row.

Additional features, objects and advantages of the present invention are included in the following detailed description, which description should be read in conjunction with the accompanying drawings.

BRIEF DESCRIPTION OF THE DRAWINGS

FIG. 1 is an isometric view of the improved removable memory card, showing its top, front side and left side;

FIG. 2 is a top plan view of the memory card of FIG. 1;

FIG. 3 is an expanded view of a portion 41 of the top plan view of FIG. 2, most accurately showing the structure of its recesses and contacts;

FIG. 4 is a sectional view of the memory card of FIG. 1, taken at section 4-4 of FIG. 2; and FIG. 5 is a bottom plan view of the memory card of FIG. 1.

DETAILED DESCRIPTION OF THE MEMORY CARD

One or more integrated circuit chips (not shown) forming the memory system are encased in a plastic card 11 of generally rectangular shape in plan view with three corners being slightly rounded and the fourth corner being cut to form an angled surface (edge) 13 between a front side 15 and a left side 17. As shown in the drawings, the angled edge 13 intersects the adjacent sides 15 and 17 with substantially the same angle, about 45 degrees. Ten electrical contacts connected with the memory circuit chip(s) within the card are positioned in nine recesses in the top surface along the front side (edge) 15 and the angled edge 13. Because of the small size of the card, two contacts of smaller size are positioned in one of the recesses and a single contact of smaller size is positioned in a recess along the angled edge 13. Of course, a different number of contacts may alternately be used.

More specifically, as best shown in FIG. 3, recesses 19-26 are provided in a row along the front side (edge) 15 and a recess 27 along the angled edge 13. Each of the recesses is elongated in a direction perpendicular to the front side 15, provides a recessed bottom surface that is parallel with the top surface of the card and has walls surrounding three sides that make it more difficult for fingers handling the card to touch the contacts within the recess. The contacts are positioned a small distance from the front side (edge) of the card for the same purpose. But since each of the recesses opens outward through the front side 15 or edge 13 of the card, mating contacts of a receptacle (not shown) easily slide into and out of the recesses over the contacts within them as the card is respectively inserted into or removed from the receptacle.

The recesses 20-26 each contain a respective one of rectangularly shaped electrical contacts 31-37, respectively. In the same area occupied by any one of these contacts, two contacts 38 and 39 are positioned in the recess 19. In this example, the contact 38 is positioned behind the contact 39. One contact 40 of this smaller size is positioned in the recess 27 because that recess is shorter than the others. A front edge of the contact 40 is displaced a further distance away from the front card edge 15 than are the other contacts 31-37 and 39. Ten contacts are thus positioned across the small width of the card instead of just eight contacts of the same width that would fit along the front side 15 alone.

As shown in FIG. 5, a label may be attached to a bottom of the card 11 in a slight recess 43 provided in the bottom surface for that purpose.

Although the invention has been described as implemented in a specific card example, it will be understood that the invention is entitled to protection within the scope of the appended claims.

It is claimed:
1. A flat rectangularly shaped memory card, comprising:
two pairs of opposing parallel straight edges forming four corners wherein one of said corners includes an angled edge segment that intersects adjacent ones of the straight edges at acute angles;
a first group of rectangularly shaped recesses formed in a row extending along one of said adjacent straight edges, each recess in said first group containing an electrical contact at the bottom of such recess, said first group of recesses with contacts being compatible with and simultaneously electrically connectable with contacts of a first type of memory card receptacle; and a second group of one or more recesses, each of which recess containing one or more electrical contacts, said first and second groups of recesses with contacts together being compatible with and simultaneously electrically connectable with contacts of a second type of memory card receptacle.

2. The memory card of claim 1, said first group of recesses with contacts being compatible with the MMC contact format, said first and second groups of recesses with contacts together being compatible with the SD contact format.

3. A flat memory card having a rectangular shape with a cutoff corner forming an angled edge segment between two card edges and having a plurality of rectangularly shaped recesses formed in a row along one of the two card edges and opening to said one of the two card edges, each of the plurality of recesses having an electrical contact on a bottom surface thereof, wherein said electrical contacts are positioned in a pattern according to a multi-media card (MMC) standard, a single electrical contact being included in each of said recesses, and an additional recess having a contact therein is provided, wherein said electrical contacts positioned in a pattern according to the MMC standard and said contact in said additional recess together are positioned in a pattern according to a memory card standard different from the MMC standard.

4. A flat rectangularly shaped memory card comprising: a card body with a contact structure compatible for use with a first electronic device designed to simultaneously electrically connect with a first number of contacts of the contact structure, said contact structure compatible for use with a second electronic device designed to simultaneously electrically connect with a second number of contacts of the contact structure, wherein the first number is different than the second number, said contact structure allowing said memory card to be used with the second electronic device, wherein at least one contact of said contact structure is used by both said first and second electronic devices.

5. A memory card comprising: means for contacting the memory card in order to transfer signals between the memory card and an electronic device, said means for contacting configured to make contact with a first device compatible for use with a first memory card having a first electrical contact structural format, said means for contacting configured to make contact with a second device compatible for use with a second memory card having a second electrical contact structural format, said first structural format being different than said second structural format, wherein at least a portion of said means for contacting is used to make contact with said first device and said portion is used to make contact with said second device.

6. A memory card comprising a plurality of contacts forming contact structure compatible with both a first card format and a second card format, said first card format requiring simultaneous electrical connection with a first number of said plurality of contacts and said second card format requiring simultaneous electrical connection with a second number of said plurality of contacts, said second number differing from the first number, wherein a card of said first card format is not capable of being accepted by a device designed to accept a card of said second card format, wherein at least one contact of said plurality of contacts is used by both a device designed to accept said card of said first format and said device designed to accept said card of said second format.

7. The memory card of claim 6 wherein said first card format is an MMC format.

8. A flat rectangularly shaped memory card of a type used for storing digital pictures, comprising: a card body with a contact structure compatible with both MMC card receptacles and SD card receptacles, said contact structure having a plurality of contacts for providing simultaneous electrical connections to the MMC card receptacle or the SD card receptacle, wherein at least one contact of said plurality of contacts is used by said MMC card receptacle and by said SD card receptacle.

* * * * *